United States Patent Office 3,278,482
Patented Oct. 11, 1966

3,278,482
POLYOLEFINS STABILIZED WITH SULFONAMIDES
Giuseppe Leandri, Poggio Franco, Italy, assignor to Montecatini Società Generale per l'Industria Mineraria e Chimica, Milan, Italy, a corporation of Italy
No Drawing. Filed June 12, 1962, Ser. No. 201,816
Claims priority, application Italy, June 13, 1961, 10,765/61
7 Claims. (Cl. 260—45.9)

The present invention relates to stabilized polymeric compositions of poly-alpha-olefins and to a process for stabilizing fibers, films and other manufactured articles of crystalline olefin polymers, particularly polypropylene.

It is known that polyolefin materials undergo a certain degredation during hot working, particularly in the presence of atmospheric oxygen.

It is also known that articles manufactured from crystalline polyolefins are sensitive to the action of light and to thermal treatment.

This degradation action can be reduced by the addition of various protective substances to the polymer, generally during the preparation of fibers, films, etc. therefrom.

Typical protective substances used heretofore include small proportions of amines, aminophenols, chelates of transition metals (e.g., Ni), organotin compounds, triazo compounds, zinc compounds, dithiocarbamates, phenols, phosphites, mercaptans, oximes, polyquinolines, sulfur derivatives, silicones, thiophosphites, and the like.

I have now surprisingly found that compounds of the general formula $$RSO_2\text{—}NH\text{—}R' \qquad (1)$$

wherein R and R' may be alkyl or aryl, either simple or substituted, in which the substituents can be alkyl, aryl, or thiocyano radicals, and wherein R' also may be hydrogen, exhibit a high stabilizing action on polymeric olefins when mixed therewith in an amount up to about 2% by weight of the crystalline olefin polymer.

Particularly suitable stabilizing compounds of the above general formula include:
(1) benzylsulfonamide

and
(2) N(p-thiocyanophenyl)-p-toluenesulfonamide $$(CH_3\text{—}C_6H_4\text{—}SO_2NHC_6H_4\text{—}SCN)$$

The present invention thus relates to polymeric compositions which are stable against the action of heat, aging and light, which compositions comprise (a) a crystalline polyolefin, e.g., polypropylene and (b) from about 0.02% to 2% by weight based on the weight of the polyolefin of a compound of the general formula

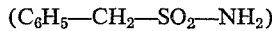

in which R and R' have the previously defined meanings.

The above compositions can be used in combination with other stabilizers, e.g., ultra violet absorbers, as well as with pigments, dyes, fillers, and anti-acid substances such as inorganic salts of stearic acid.

The addition of an inorganic salt of stearic acid to the composition before spinning has been found to improve the stability characteristics of such polymeric compositions. As an inorganic salt of stearic acid, calcium stearate is particularly suitable.

The stabilizers of the present invention are effective also in the stabilization of compositions comprising a crystalline polyolefin and a basic nitrogen compound (e.g., polyalkyleneimines, condensation products of dichloroethane with polyfunctional amine, condensation products of epichlorohydrin with amines, polyvinylpyridine, etc.), which compositions can be used to produce fibers having improved tinctorial characteristics.

The stabilizers of the present invention can be used alone or in admixture with other stabilizing systems, e.g., with a dialkylphenol sulphide, particularly 4,4'-thiobis-6-tertiary butylmetacresol, and a beta-thioether of a propionic acid ester, particularly lauryl thiodipropionate or a thioester obtained from thiodiglycol and aliphatic acids.

The stabilizers and/or the above stabilizing mixtures of the present invention are also suitable for the stabilization of compositions comprising a crystalline polyolefin which has been colored by the addition of organic or inorganic dyeing pigments to the polymer/stabilizer mix before extrusion.

The stabilized compositions of the present invention can be utilized to produce fibers, films or manufactured articles.

The spinning of the compositions of the present invention is preferably carried out by extrusion through spinnerets with holes having a length to diameter ratio which is higher than 1.

After spinning, the yarns are subjected to a stretching treatment with a stretching ratio of from 1:2 to 1:10 at a temperature of from about 80 to 150° C., in a stretching device which is heated with hot air, steam or a similar fluid, or else is provided with a heating plate.

The application of the stabilizing compounds of the invention is generally carried out by mixing such compounds with the polyolefin while agitating.

However, the stabilizer can also be added by other methods such as by mixing the polyolefin with a solution of the stabilizer in a suitable solvent and then evaporating off the solvent, or by adding the stabilizer to the polyolefin at the end of the polymerization. It is also possible to obtain the stabilizing action by applying the stabilizing compound onto the manufactured article, e.g., by immersing the article in a stabilizer solution or dispersion and then evaporating off the solvent.

The compounds of the present invention exhibit a good compatibility with polyolefins in the molten state and have no staining action.

The stabilized compositions of the present invention are particularly suitable for preparing mono- and plurifilaments, staple, dyable yarns, bulky yarns, films, tapes, shaped articles and the like.

The following examples will further illustrate the invention.

The polymer used in these examples exhibits crystallinity due to the presence of the isotactic structure. It was prepared with stereospecific catalysts, prepared from an alkyl aluminum compound and a crystalline transition metal halide.

*Examples 1 to 4*

The data relating to these examples is reported in Table I.

TABLE I

|  | Ex. 1 | Ex. 2 | Ex. 3 | Ex. 4 |
|---|---|---|---|---|
| Composition of the mix— | | | | |
| (a) polypropylene: | | | | |
| Intrinsic viscosity ($\eta$) (as determined in tetrahydronaphthalene at 135° C.) | 1.69 | 1.69 | 1.34 | 1.34 |
| Ash content, percent | 0.03 | 0.03 | 0.028 | 0.028 |
| Residue from heptane extraction, percent | 93.1 | 93.1 | 94.3 | 94.3 |
| (b) Stabilizer, percent | [1] 0.5 | | [2] 0.5 | |
| Type of mixer | Henschel | Henschel | Henschel | Henschel |
| Color of the mix when molten in a test tube at 250° C., for 10 minutes | Clear | Clear | Clear | Clear |
| Spinning conditions: | | | | |
| Screw temperature, ° C | 230 | 230 | 220 | 220 |
| Head temperature, ° C | 210 | 220 | 220 | 220 |
| Spinneret temperature, ° C | 210 | 210 | 230 | 240 |
| Spinneret type, mm | 60/0.8 x 16 | 60/0.8 x 16 | 60/0.8 x 16 | 60/0.8 x 16 |
| Max pressure (kg./cm.) | 45 | 45 | 40 | 50 |
| Winding speed (meters/minute) | 250 | 250 | 300 | 200 |
| Stretching conditions: | | | | |
| Temperature, ° C | 110 | 110 | 130 | 130 |
| Medium | Steam | Steam | Steam | Steam |
| Stretching ratio | 1:4.5 | 1:5.3 | 1:5.3 | 1:5.3 |
| Characteristics of the stretched yarn: | | | | |
| Tenacity, (g./den.) | 5.15 | 5.65 | 5.44 | 5.07 |
| Elongation, percent | 22.7 | 18 | 21 | 23 |
| Thermal degradation (percent decrease of intrinsic viscosity upon extrusion) | 65 | 63 | 82 | 74.5 |
| Stability to accelerated thermal aging (percent residual tenacity after exposure at 120° C. in an air-circulation oven for 15 hours) | 49 | Brittle | 90 | Brittle |
| Stability to sun light (percent residual tenacity after exposure to summer sun light for 200 hrs.) | 63 | 29 | 64 | 28 |

[1] Benzylsulfonamide.  [2] N(p-thiocyanphenyl)-p-toluensulfonamide.

Variations can be made without departing from the spirit of the invention.

Having thus described my invention, what I desire to secure and claim by Letters Patent is:

1. A polymeric composition which is stable against the action of heat, aging, and light, comprising crystalline polypropylene exhibiting isotatic structure and a stabilizing amount of a compound of the formula $$RSO_2—NH—R'$$

wherein R is selected from the group consisting of alkyl, aryl, aralkyl, and alkaryl, and wherein R' is selected from the group consisting of hydrogen, alkyl, aryl, aralkyl, alkaryl, and thiocyanoaryl.

2. The polymeric composition of claim 1 wherein the amount of stabilizing compound is from about 0.02 to 2% based on the weight of the polypropylene.

3. The polymeric composition of claim 1 wherein the amount of stabilizing compound is from about 0.2 to 1% based on the weight of the polypropylene.

4. The polymeric composition of claim 1 wherein the stabilizing compound is benzylsulfonamide.

5. The polymeric composition of claim 1 wherein the stabilizing compound is N(p-thiocyanophenyl)-p-toluenesulfonamide.

6. The product of claim 1 in filamentary form.

7. The product of claim 1 in film form.

References Cited by the Examiner
UNITED STATES PATENTS

| 2,349,749 | 1/1943 | Paul | 260—809 |
| 2,352,950 | 7/1944 | Gates | 252—402 |
| 2,985,617 | 5/1961 | Salyer et al. | 260—45.9 |
| 3,102,106 | 8/1963 | Regan | 260—45.9 |
| 3,107,229 | 10/1963 | Malz et al. | 260—45.9 |

FOREIGN PATENTS

| 811,942 | 4/1959 | Great Britain. |
| 1,250,524 | 12/1960 | France. |

LEON J. BERCOVITZ, *Primary Examiner.*

H. E. TAYLOR, *Assistant Examiner.*